United States Patent [19]

Nakagawa

[11] 3,946,564
[45] Mar. 30, 1976

[54] OIL-HYDRAULIC SERVO-MOTOR
[75] Inventor: Tadao Nakagawa, Ueda, Japan
[73] Assignee: Nisshin Kogyo Kabushiki Kaisha, Ueda, Japan
[22] Filed: Sept. 17, 1974
[21] Appl. No.: 506,901

[30] Foreign Application Priority Data
July 19, 1974 Japan............................. 49-83644

[52] U.S. Cl. .................. 60/548; 60/582; 91/434
[51] Int. Cl.² ........................................ F01K 17/00
[58] Field of Search ............ 60/552, 547, 550, 548, 60/555, 557, 558, 563, 582, 575, 591, 592, 413, 418; 91/378, 391 R, 434; 303/21 F

[56] References Cited
UNITED STATES PATENTS

| | | | |
|---|---|---|---|
| 2,880,586 | 4/1959 | Lincoln | 91/434 |
| 2,908,137 | 10/1959 | Spalding et al. | 91/378 X |
| 3,173,339 | 3/1965 | Larsen | 91/391 R |
| 3,696,615 | 10/1972 | Grabill, Jr. et al. | 91/391 R X |
| 3,815,364 | 6/1974 | Belart et al. | 60/552 |

FOREIGN PATENTS OR APPLICATIONS
1,117,719   1902   France.................. 60/548

Primary Examiner—Martin P. Schwadron
Assistant Examiner—H. Burks, Sr.
Attorney, Agent, or Firm—Haseltine, Lake & Waters

[57] ABSTRACT

An oil-hydraulic servo-motor, usable with an automotive brake, including a control piston slidably extending through the rear end wall of a power cylinder in aligned opposite relation to an output piston therein and forming together with the cylinder end wall a spool-type control valve which is operable to energize and de-energize the power cylinder. The control piston is axially movable normally within definite limits under the operator's input, and abutment means provided to limit the extent of advancing movement of the control piston is rendered inoperable automatically upon failure of an associated oil pressure circuitry to enable the control piston to drive the output piston directly under the operator's input. The oil pressure circuitry may be formed in two independently operable systems. Major features include simplicity of the valving mechanism and hence of the entire structure of the servo-motor and a highly improved reliability in operation.

2 Claims, 2 Drawing Figures

OIL-HYDRAULIC SERVO-MOTOR

BACKGROUND AND SUMMARY OF THE INVENTION

This invention relates generally to oil-hydraulic servo-motors and particularly to those of the type usable on vehicles carrying an appropriate source of oil pressure, principally in connection with the brake system of such vehicle.

The present invention has for its primary object the provision of an improved oil-hydraulic servo-motor of the type described which is simplified in construction and highly reliable in operation compared with conventional forms of such servo-motor and which is designed normally to produce an output hydraulically controlled in response to the limited motion of an associated operating member such as a brake pedal, thus enabling the operator to feel the magnitude of the servo output and avoid any excessive operation, and is also operable to drive the output piston directly under the input of the operator in the event of failure of the associated oil pressure system.

Another object of the present invention is to provide an oil-hydraulic servo-motor of the character described which is further improved in reliability with the associated oil pressure circuit, formed in two independently operable systems, each including a source of oil pressure and arranged so that, even if either of the two oil circuit systems become inoperable due to oil leakage or other failure therein, the output piston in the associated power cylinder can be hydraulically operated in a regular fashion under control of the other, normally operating oil circuit system and, upon failure of both of the two oil circuit systems, such output piston can obviously be operated in a mechanical fashion directly under the operator's input.

These and other objects, features and advantages of the present invention will become apparent from the following description when taken in conjunction with the accompanying drawings, which illustrate two preferred exemplary embodiments of the invention, both designed for use with a brake system of an automotive vehicle.

DESCRIPTION OF THE PREFERRED EMBODIMENTS

Figure 1:
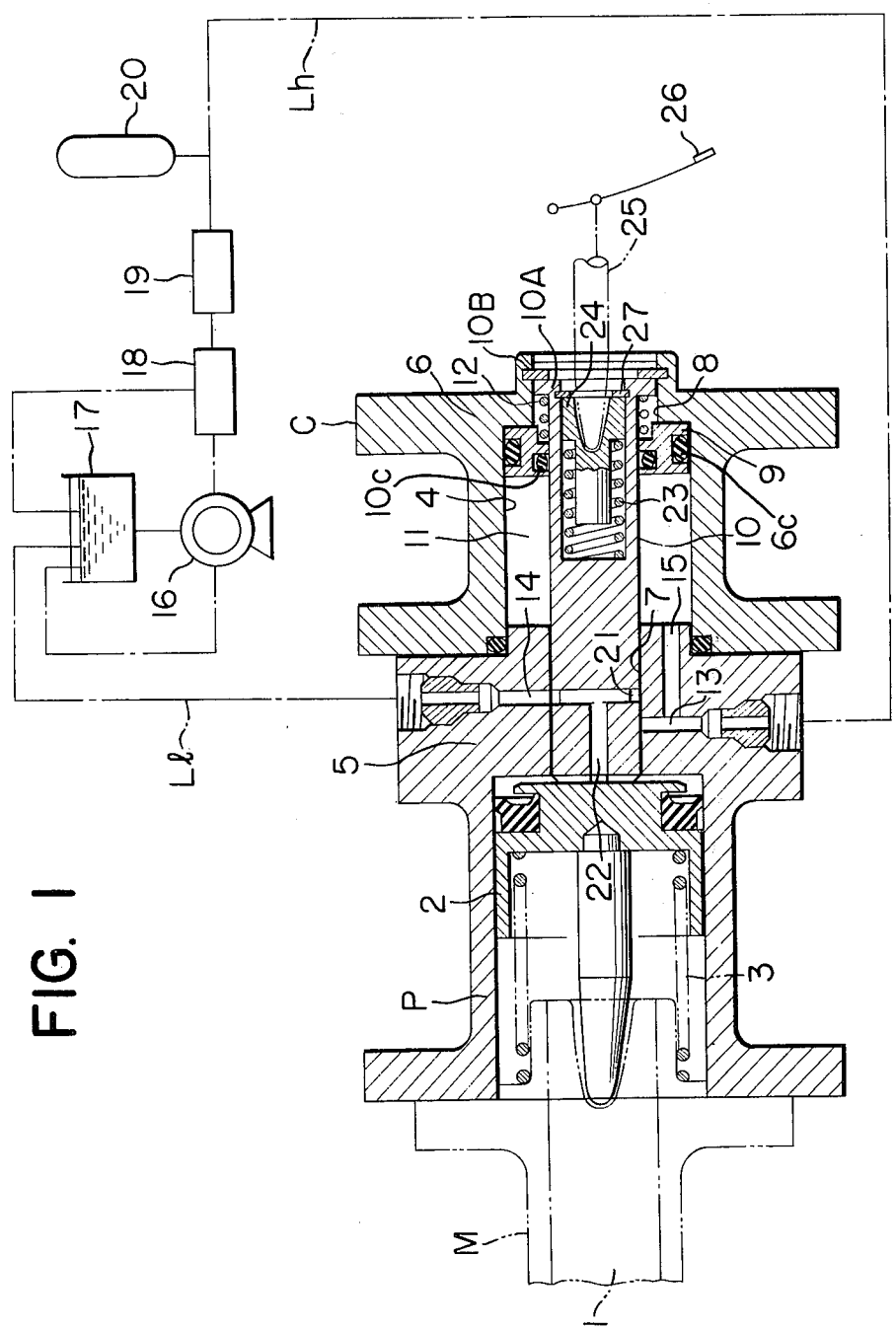
FIG. 1 is a side elevational view, in longitudinal cross section, of an exemplary oil-hydraulic servo-motor embodying the present invention, showing the associated oil pressure circuit in schematic form.

Referring first to FIG. 1, reference character M designates a well-known form of brake master cylinder, in which an operating piston 1 is slidably fitted to serve the purpose of supplying pressure oil to the hydraulic actuators in the associated brake system. Connected to the rear of the brake master cylinder M is a power cylinder P to the rear of which a control casing C is connected. An output piston 2 is slidably fitted in the power cylinder P and operably connected with the operating piston 1 in the brake master cylinder M at the rear end of the operating piston 1 with a restoring spring 3 arranged under compression between the operating piston 1 and the output piston 2 to bias the latter rearwardly relative to the operating piston 1.

The control casing C defines therein a cylindrical bore 4 of a larger diameter which communicates at the front end with a smaller-diameter bore 7 formed in the rear end wall 5 of the power cylinder P, which is a boundary wall separating the cylindrical bore 4 and the interior space of the power cylinder P from each other, and at the rear end with another smaller-diameter bore 8 formed in the rear end wall of the control casing C. An annular abutment piston 9 is slidably fitted in the cylindrical bore 4 to define a fixed-pressure chamber 11 therein on the front side of the abutment piston 9. Slidably extending through the annular abutment piston 9 is a control piston 10 which is slidably fitted at the front end in the bore 7 formed in the rear wall 5 of the power cylinder P and which is formed at the rear end with an annular abutting shoulder 10A, which is slidably fitted in the bore 8 formed in the rear wall 6 of the control casing C. FIG. 1 shows a sealing member 6C, e.g. a conventional elastic O-ring, facing the casing C, and a similar sealing member 10C, facing the control piston 10.

As shown, a restoring spring 12 is arranged under compression between the abutting shoulder 10A on the control piston 10 and the abutment piston 9 to bias the abutting shoulder 10A and hence the control piston 10 rearwardly relative to the abutment piston 9. An annular stop 10B is snapped in the wall of bore 8, formed in the rear wall 6 of the control casing C, to limit retracting movement of the control piston 10. In the retracted position as defined by the annular stop 10B, the control piston 10 has its front end slightly extended into the interior space of the power cylinder P, as shown, to define the fully retracted position of the output piston 2.

Formed in the boundary wall or rear wall 5 of the power cylinder P are a pair of high pressure and low pressure fluid ports 13, 14 which open into the bore 7 at respective points axially offset from each other and a fluid conduit 15 which communicates the high pressure fluid port 13 with the fixed-pressure chamber 11 in the control casing C. The high pressure fluid port 13 is connected to the discharge port of an oil-hydraulic pump 16 through the intermediary of a high pressure line Lh while the low pressure fluid port 14 is connected to an oil reservoir 17 through the intermediary of a low pressure line Ll. As shown, in the high pressure line Lh are inserted a pressure regulator valve 18, a check or non-return valve 19 serving to maintain the high pressure on the downstream side thereof, and a pressure accumulator 20.

The control piston 10 is formed therein with fluid conduit means including an annular port 21, which extends circumferentially around the periphery of that portion of control piston 10 which is in sliding engagement with the wall of bore 7 formed in the rear wall 5 of power cylinder P, and an axial conduit 22, which serves to maintain fluid communication between the annular port 21 and the interior of the power cylinder P. It is to be noted that the annular port 21 is axially located so as to communicate with the low pressure fluid port 14 in the rear wall of power cylinder P when the control piston 10 is in its fully retracted position, as shown, and with the high pressure fluid port 13 when the control piston 10 is in a predetermined advanced position.

Further, the control piston 10 has an axial bore formed in the rear end portion thereof to slidably receive a minor piston 24 and a cushioning spring 23 therefor. The minor piston 24 is in pressure engagement with the front end of a push rod 25, to the outer, base end of which an appropriate brake pedal 26 is pivotally secured intermediate the ends thereof. Reference numeral 27 designates a retainer ring snapped into place to prevent the minor piston 27 from slipping off.

Description will next be made of the operation of the above-described embodiment of the invention. First, when the servo-motor is in its free or inoperative state, as shown in FIG. 1, the fixed-pressure chamber 11 in the control casing C is supplied with pressure oil from the oil pressure pump 16 or pressure accumulator 20, as long as such is normally working, through the high pressure line L$h$ and the fluid conduit 15 and the abutment piston 9 is held firmly in its rearmost position under the oil pressure in the chamber 11 thereby to hold the control piston 10 in its fully retracted position by means of the restoring spring 12 seated against the abutting shoulder 10A on the control piston 10. In this state, since the annular port 21 is in fluid communication with the low pressure fluid port 14, the interior of the power cylinder P is released to the oil reservoir 17 through the low pressure line L$l$, allowing the output piston 2 to be held in its fully retracted position abutting against the front end of the control piston 10 under the bias of restoring spring 3.

Now, when the brake pedal 26 is operated by the operator to move the control piston forward, initially the low pressure fluid port 14 is closed by that portion of the peripheral surface of control piston 10 which lies adjacent the rear edge of the annular port 21, and then the latter port 21 is brought into fluid communication with the high pressure fluid port 13, allowing the pressure oil previously fed therein to proceed through the conduit 22 into the power cylinder P and cause an output motion of the output piston 2 which drives the operating piston 1 in the master cylinder M forwardly to operate the associated brake system.

The oil pressure entering the power cylinder P also acts upon the front end face of the control piston 10 to urge the latter rearwardly as a reaction to the pedal input and thus enables the operator to feel the magnitude of the oil pressure in the power cylinder P and hence the magnitude of the servo output effected through the output piston 2.

Subsequently, as the abutting shoulder 10A on the control piston 10 comes into abutting engagement with the rear face of the abutment piston 9, the high pressure fluid port 13 is fully opened, rendering the oil pressure in the power cylinder P equal to that in the high pressure line L$h$, and the servo output reaches its maximum. Thereafter, even if the step force on the pedal 26 is increased, there is no further advancing movement of the control piston 10 as it is held sustained by the abutment piston 9, which is now firmly held in the fully retracted position under the oil pressure in the fixed-pressure chamber 11, and the high pressure fluid port 15 remains in its full open state.

For instance, when the control piston 10 is advanced suddenly, it is subjected to an impacting reaction force from the power cylinder side but such force is substantially alleviated with elastic deformation of the cushioning spring 23, arranged between the control piston 10 and minor piston 24, and gives no feeling of shock to the operator. That is, the operator's feeling in operation of the servo system is not impaired at all irrespective of the speed of operation.

On the other hand, in cases where the oil pressure in the high pressure line L$h$ be reduced to an extreme extent or lost, for example, on account of failure of the oil-hydraulic pump 16 or pressure accumulator 20 from some cause or other, or on account of cracking failure in the high pressure line L$h$, obviously the oil pressure normally prevailing in the fixed-pressure chamber 11 to act upon the abutment piston 9 to hold it in its rearmost position is also reduced or lost. If, under such condition, an input is given to the control piston 10, its advancing movement is continued even after the abutting shoulder 10A formed on the control piston has come into abutting engagement with the abutment piston 9, causing the latter to proceed together with the control piston 10. In this manner, the control piston 10 engaging at the front end with the output piston 2 in the power cylinder P pushes forward the latter piston directly in a mechanical fashion so that the operating piston 1 in the master cylinder M is effectively driven forward under the input given to the control piston 10 despite of the failure in the high pressure line L$h$.

Figure 2:
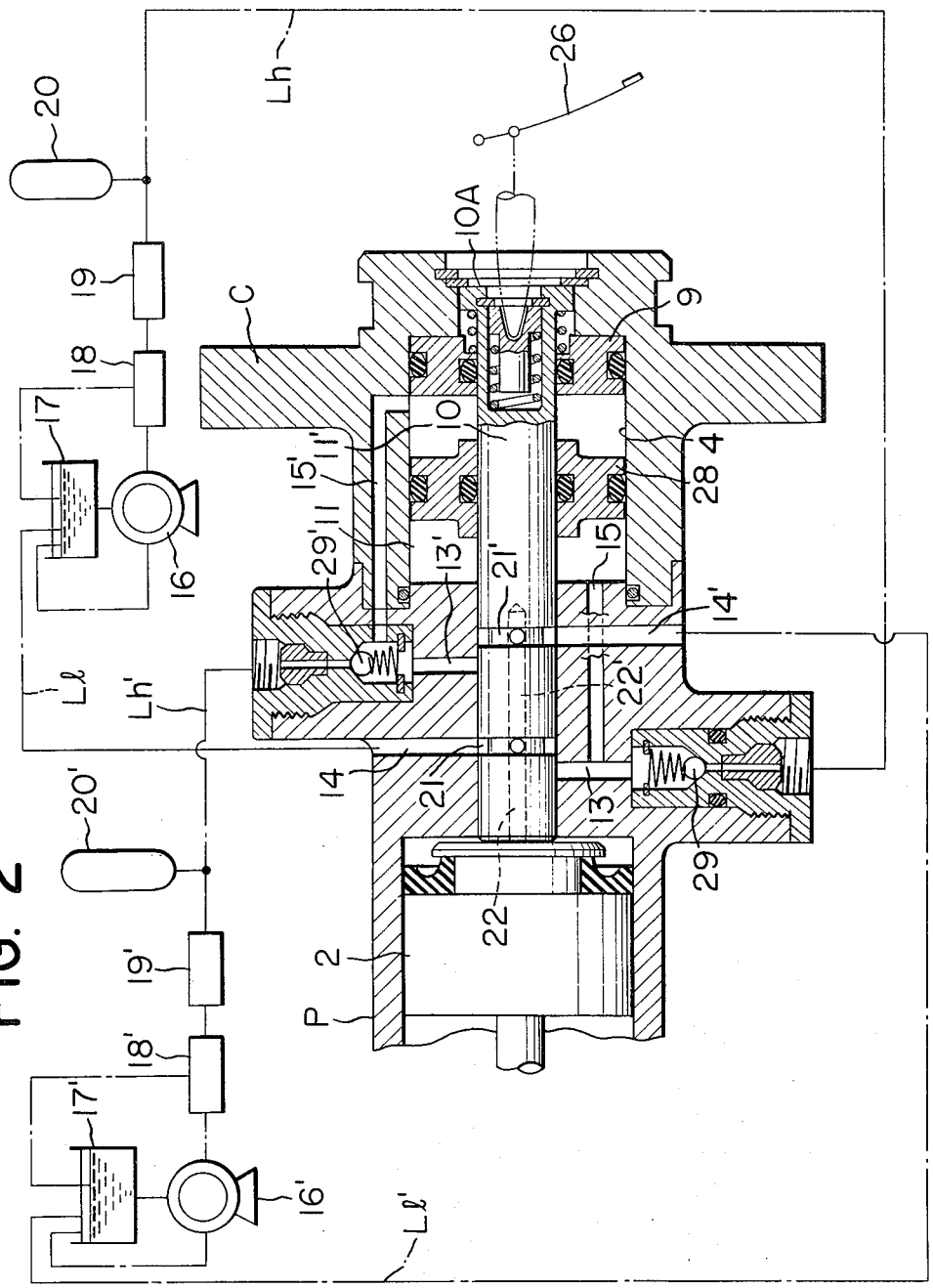
FIG. 2 is a view similar to FIG. 1, showing another embodiment of the invention.

Description will next be made of another embodiment of the present invention shown in FIG. 2. This embodiment is substantially similar in mechanical construction to the embodiment of FIG. 1 excepting that it includes a free piston 28 slidably fitted in the cylindrical bore 4 in the control casing C in a position on the front side of the abutment piston 9, and also includes a dual oil pressure system comprising two independent oil pressure circuitries of the same capacity each including a source of oil pressure and extending to the same power cylinder P.

Specifically, the boundary wall 5 between the power cylinder P and the control casing C is formed, in this embodiment, with two high pressure fluid ports 13, 13' and two low pressure fluid ports 14, 14'. The two high pressure fluid ports 13 and 13' are separately connected with respective oil pressure pumps 17, 17' through the intermediary of two respective high pressure lines L$h$ and L$h'$ while the two low pressure fluid ports 14, 14' are connected with respective oil reservoirs 17, 17' through the intermediary of two respective low pressure lines L$l$ and L$l'$. Obviously, the oil reservoirs 17, 17' may be replaced by a single oil reservoir common to the two oil circuit systems.

In each of the high pressure lines L$h$, L$h'$ are inserted, as in the case of the embodiment of FIG. 1, a pressure regulator valve 18, 18', a non-return valve 19, 19' and a pressure accumulator 20, 20'. Further in this embodiment, each of the high pressure lines L$h$, L$h'$ includes a check or non-return valve 29, 29' arranged in a position adjacent to the high pressure fluid port 13, 13' to allow flow of pressure oil only in the direction toward the high pressure fluid port 13, 13'.

The free piston 28 arranged in the control casing C is intended to divide the cylindrical bore 4 therein into a first and a second fixed-pressure chamber 11 and 11', which are in fluid communication with respective high pressure fluid ports 13, 13' through the intermediary of respective interconnecting conduits 15, 15'. It is to be noted that the free piston 28 is slidable back and forth over the control piston 10 within the cylindrical bore 4 under the pressure differential between the first and second fixed-pressure chambers 11 and 11'. Such sliding movement of the free piston 28 is limited in opposite directions by the boundary wall 5 and the abutment piston 9 so that the ends of the interconnecting conduits 15, 15' opening to the respective fixed-pressure chambers 11 and 11' may not be closed by the free piston 28 when the latter is advanced and retracted, respectively.

Further, the control piston 10 in this embodiment is formed with a pair of axially spaced annular ports 21, 21', which are in fluid communication with the power cylinder P by way of respective axial fluid conduits 22, 22'. It will be readily observed that one of the annular port 21 is arranged to co-operate with the corresponding ones of said high pressure and low pressure fluid ports, 13 and 14, as in the embodiment of FIG. 1 while the other annular port 21' is arranged similarly to co-operate with the other, corresponding ones of said high pressure and low pressure fluid ports, 13' and 14'.

With this arrangement, the two annular ports 21, 21' are placed in fluid communication with respective low pressure fluid ports 14, 14' when the control piston 10 is retracted as shown and with respective high pressure fluid ports 13, 13' when the control piston is advanced. In other words, as long as the two oil pressure circuit systems are in their normal working state, pressure oil discharged from the oil pressure pumps 16, 16' acts upon the output piston 2 in the power cylinder P for servo output as the control piston 10 is advanced, in the same manner as in the embodiment of FIG. 1. Also, in cases where either one of the two oil pressure circuit systems fails to operate from some cause or other, the output piston 2 can be operated in a regular manner by the pressure oil from the oil pressure pump 16 or 16' in the other oil pressure circuit system. In such case, the pressure oil supplied to the power cylinder P through the normally operating one of the two oil circuit systems tends to flow out through the high pressure fluid port 13 or 13' in the circuit system in failure, but this tendency is effectively overcome by the non-return valve 29 or 29' arranged adjacent to the high pressure fluid port on the upstream side thereof so that oil pressure buildup in the power cylinder P is ensured despite of the failure in the high pressure line L$h$ or L$h'$.

It is to be understood that, in normal cases where both of the oil circuit systems are properly in operation, the first and second fixed-pressure chambers 11, 11' in the control casing C are filled with pressure oil from respective high pressure lines L$h$, L$h'$ to pressures substantially equal to each other and the abutment piston 9 is held in the fully retracted position, as shown, under the oil pressure in the second fixed-pressure chamber 11' to limit the advancing movement of control piston 10 in cooperation with the abuting shoulder 10A formed thereon as with the case of the previous embodiment. On the other hand, the free piston 28 remains in an arbitrary axial position under frictional drag on both inner and outer peripheries thereof as there is no pressure differential between the two fixed-pressure chambers 11, 11' causing any substantial axial thrust to act upon the free piston 28. If, however, the pressure in the second fixed-pressure chamber 11' be reduced or lost on account of some failure in the oil pressure circuit connected with such chamber, the free piston 28 will be pushed backward under the effect of oil pressure in the normally operating first fixed-pressure chamber 11 to firmly hold the abutment piston 9 in its fully retracted position. Similarly, if the pressure in the first fixed-pressure chamber 11 be reduced or lost on account of some failure in the associated oil pressure circuit alone, the pressure normally built up in the second fixed-pressure chamber 11' will not only act to push forward the free piston 28 but will act to hold the abutment piston 9 in its fully retracted position. Thus, in either case, the extent of advancing movement of the control piston 10 is effectively limited by the abutment piston 9 co-operating with the abutting shoulder 10A formed on the control piston 10.

Finally, in cases where both oil pressure circuit systems be in failure, obviously the free piston 28 and abutment piston 9 are both robbed of any effective oil pressure acting thereon so that, when the control piston 10 is advanced under the pedal input, much movement is not obstructed at all even after the abutting shoulder 10A on the control piston has been brought into abutting engagement with the abutment piston 9, as with the case of failure in the oil pressure circuit in the embodiment of FIG. 1. In other words, the control piston 10 can be advanced directly to push forward the output piston 2 for operation of the master cylinder, not shown.

As apparent from the foregoing description, the servo-motor of the present invention has formed therein a kind of control valve comprising a high pressure and a low pressure fluid port 13, 14 (13', 14') formed in the boundary wall 5 between the power cylinder P and control casing C in axially offset relation to each other and an interconnecting fluid conduit 22 (22') formed in the control pistor 10, slidably supported by the boundary wall 5, so as to be selectively placed in fluid communication with the high pressure and low pressure fluid port 13, 14 (13', 14') with axial displacement of the control piston 10 relative to the boundary wall 5, and this makes the servo-motor extremely simple in construction, easy to manufacture and low in cost, compared with previous forms of servo-motor conventionally employing a poppet or ball type valve with biasing spring means. Further, in the servo-motor of the present invention, an abutment piston 9 is arranged so as to be normally held firmly in its fully retracted position under oil pressure to serve the purpose of limiting the extent of advancing movement of the control piston, which has its front end presented to the interior of the power cylinder P in aligned opposite relation to the rear and face of the output piston 2 fitted in the power cylinder P. This arrangement makes it possible to accurately define the forward limit of axial movement of the control piston 10 and thereby to maintain the high pressure fluid port 13 (13') in its full open state during normal operation of the associated oil pressure circuit, and there is no closing of the high pressure fluid port 13 (13') as resulting from any excessive advancing movement of the control piston 10. In addition, with any input to the control piston, a reaction force is transmitted back to the control piston from the power cylinder side, enabling the operator feeling such reaction force to know the magnitude of the output of the power cylinder P, and any excessive input operation can be avoided. Moreover, in failure of the associated oil pressure circuitry, the control piston 10 can be operated without any restraint of the abutment piston 9 directly to drive forward the output piston 2 and thus an extraordinarily high safety characteristic results.

According to the secondary feature of the present invention, including an oil pressure circuitry formed in two systems operable independently from each other and a free piston 28 arranged to divide the fixed-pressure chamber intended to apply oil pressure to the abutment piston 9 into two sections connected to the respective oil pressure circuit systems, the output piston 2 can be hydraulically operated in a regular fashion even if some failure occur in one or the other of the two oil pressure circuit systems and this apparently further improves the safety characteristic of the servo-motor.

While particular embodiments of the present invention have been shown and described, it is obvious to those skilled in the art that it is not so limited but is susceptible of various changes and modifications without departing from the spirit or scope of the invention.

What is claimed is:

1. An oil-hydraulic servo-motor comprising a power cylinder with an output piston slidably fitted therein, a control casing connected to the rear end of said power cylinder and having a cylindrical bore aligned therewith, an abutment piston slidably fitted in said cylindrical bore and defining a fixed-pressure chamber therein on the front side of said abutment piston, a control piston slidably fitted through said abutment piston and through a boundary wall separating the interior space of said power cylinder and said chamber in said casing, said control piston having its front end face presented to said interior space of the power cylinder in aligned opposite relation to the rear end face of said output piston in said power cylinder, an abutting shoulder formed around said control piston at the rear end thereof for abutting engagement with said abutment piston upon movement of said control piston to a predetermined advanced position, a high-pressure and a low-pressure fluid port, both formed in said boundary wall and opening into an axial bore formed therein to slidably receive said control piston at points axially offset from each other, a fluid conduit formed in said control piston and opening at one end into said interior space of the power cylinder, said fluid conduit communicating at the other end thereof with said low-pressure fluid port when said control piston is in its fully retracted position, and with said high-pressure fluid port when said control piston is in said advanced position, a source of oil pressure connected with said chamber and with said high-pressure fluid port, an oil reservoir connected with said low-pressure fluid port, and an oil-pressure circuitry formed in two circuit systems, operable simultaneously and independently of each other, each system including circuit components respectively corresponding to said oil source, said reservoir, said fluid ports and said fluid conduit, further comprising a free piston slidably fitted in said cylindrical bore in the casing and over said control piston to divide said chamber into two sections to each of which said oil source is connected in the corresponding one of said circuit systems.

2. The servo-motor as defined in claim 1, further comprising two non-return valves, each inserted in the fluid line interconnecting said high-pressure fluid port and said oil source in the corresponding one of said circuit systems, in a position as close as possible to said high-pressure fluid port, to allow flow of oil only in a direction from said oil source to said high-pressure fluid port.

* * * * *